US011038221B2

(12) United States Patent
Takabayashi et al.

(10) Patent No.: US 11,038,221 B2
(45) Date of Patent: Jun. 15, 2021

(54) STORAGE BATTERY MODULE WITH A HEAT DISSIPATING PLATE FOR INTERCONNECTING BATTERY CELLS

(71) Applicant: MITSUBISHI ELECTRIC CORPORATION, Tokyo (JP)

(72) Inventors: Hirokazu Takabayashi, Tokyo (JP); Hidetoshi Kitanaka, Tokyo (JP); Yukihiro Yoshida, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 106 days.

(21) Appl. No.: 16/085,943

(22) PCT Filed: Mar. 23, 2016

(86) PCT No.: PCT/JP2016/059196
§ 371 (c)(1),
(2) Date: Sep. 17, 2018

(87) PCT Pub. No.: WO2017/163336
PCT Pub. Date: Sep. 28, 2017

(65) Prior Publication Data
US 2019/0103640 A1  Apr. 4, 2019

(51) Int. Cl.
*H01M 10/613* (2014.01)
*H01M 10/647* (2014.01)
(Continued)

(52) U.S. Cl.
CPC ..... *H01M 10/613* (2015.04); *H01M 10/4257* (2013.01); *H01M 10/647* (2015.04);
(Continued)

(58) Field of Classification Search
None
See application file for complete search history.

(56) References Cited

U.S. PATENT DOCUMENTS

2012/0153901 A1* 6/2012 Hermann ............ H01M 10/625
320/135
2014/0370343 A1  12/2014 Nomoto et al.
(Continued)

FOREIGN PATENT DOCUMENTS

JP  2002177821 A  6/2002
JP  2014086246 A  5/2014
(Continued)

OTHER PUBLICATIONS

International Search Report (PCT/ISA/210) dated Jun. 21, 2016, by the Japanese Patent Office as the International Searching Authority for International Application No. PCT/JP2016/059196.
(Continued)

*Primary Examiner* — Brian R Ohara
(74) *Attorney, Agent, or Firm* — Buchanan Ingersoll & Rooney PC

(57) ABSTRACT

This storage battery module includes battery cells, a first plate-shaped member, and a second plate-shaped member opposing the first plate-shaped member across an insulating member. The first plate-shaped member has conductors formed therein. The second plate-shaped member has formed therein a heat dispersion region opposing at least a portion of the conductors of the first plate-shaped member across the insulating member. Heat generated in the conductors of the first plate-shaped member is transferred to the heat dispersion region of the opposing second plate-shaped member, and the heat is dispersed inside the heat dispersion region.

4 Claims, 19 Drawing Sheets

(51) Int. Cl.
*H01M 10/6553* (2014.01)
*H01M 10/6554* (2014.01)
*H01M 50/50* (2021.01)
*H01M 50/20* (2021.01)
*H01M 10/42* (2006.01)

(52) U.S. Cl.
CPC ... *H01M 10/6553* (2015.04); *H01M 10/6554* (2015.04); *H01M 50/20* (2021.01); *H01M 50/50* (2021.01)

(56) References Cited

U.S. PATENT DOCUMENTS

| | | | |
|---|---|---|---|
| 2015/0132611 A1 | 5/2015 | Feuillard et al. | |
| 2015/0180098 A1 | 6/2015 | Eckl et al. | |
| 2016/0093930 A1* | 3/2016 | Biskup | H01M 10/625 429/72 |

FOREIGN PATENT DOCUMENTS

| | | |
|---|---|---|
| JP | 2015-520925 A | 7/2015 |
| JP | 2015170454 A | 9/2015 |
| JP | 2015527708 A | 9/2015 |
| WO | 2012011237 A1 | 1/2012 |

OTHER PUBLICATIONS

Written Opinion (PCT/ISA/237) dated Jun. 21, 2016, by the Japanese Patent Office as the International Searching Authority for International Application No. PCT/JP2016/059196.

Japanese Office Action for Japanese Patent Application No. 2018-506676 dated Apr. 25, 2018, and English translation.

Office Action (Notification of Reasons for Refusal) dated Sep. 25, 2018, by the Japanese Patent Office in corresponding Japanese Patent Application No. 2018-506676 and English translation of the Office Action. (6 pages).

* cited by examiner

STORAGE BATTERY MODULE WITH A HEAT DISSIPATING PLATE FOR INTERCONNECTING BATTERY CELLS

TECHNICAL FIELD

The present disclosure relates to a storage battery module equipped with battery cells.

BACKGROUND ART

In a storage battery module equipped with battery cells, flexible printed circuits (FPC) substrates are used as a means for electrically connecting the battery cells together. In a storage battery module disclosed in Patent Literature 1, a first circuit that detects voltage between terminals of a battery cell is mounted on a FPC substrate that is provided on one side of a battery block, and a voltage detection line for electrically connecting the first circuit with a positive or negative electrode of each battery cell is provided.

CITATION LIST

Patent Literature

Patent Literature 1: International Publication No. WO 2012/011237

SUMMARY OF INVENTION

Technical Problem

In the storage battery module disclosed in Patent Literature 1 that is equipped with battery cells, a temperature of a battery cell situated in the middle in an arrangement direction of the battery cells gets higher in comparison with a temperature of a battery cell situated at an end in the arrangement direction, resulting in a variance in specific resistivity among the battery cells. There is an issue where a lifespan of the storage battery module as a whole is shortened due to a variance in lifespans among battery cells caused by a variance in voltages among the battery cells because of the variance in specific resistivity.

In consideration of circumstances such as those described above, an objective of the present disclosure is to suppress or prevent a variance in temperature among the battery cells.

Solution to Problem

In order to achieve this objective, a storage battery module of the present disclosure includes battery cells, a first plate-shaped member, and a second plate-shaped member. The first plate-shaped member has first connecting conductors formed therein, the first connecting conductors (i) being conductors that electrically connect together terminals of the battery cells that are adjacent to one another, and (ii) being separated from one another by a first insulator. The second plate-shaped member has a heat dispersion region formed by a member that has a thermal conductivity that is greater than or equal to a second threshold, the heat dispersion region opposing at least a portion of the first connecting conductors of the first plate-shaped member across an insulating member having a thickness that is less than or equal to a first threshold in a direction perpendicular to a main surface of the first plate-shaped member, to cause heat transferred from the first connecting conductors to be dispersed into the heat dispersion region.

Advantageous Effects of Invention

According to the present disclosure, a temperature variance among the battery cells can be suppressed or prevented by providing the first plate-shaped member having a conductor formed therein to electrically connect the terminals of battery cells and the second plate-shaped member having a heat dispersion region to cause heat transferred from the conductor of the first plate-shaped member to be dispersed inside the heat dispersion region.

DESCRIPTION OF EMBODIMENTS

Embodiments of the present disclosure are described below in detail with reference to the drawings. Throughout the drawings, components that are the same or equivalent are assigned the same reference signs.

Embodiment 1

Figure 1:
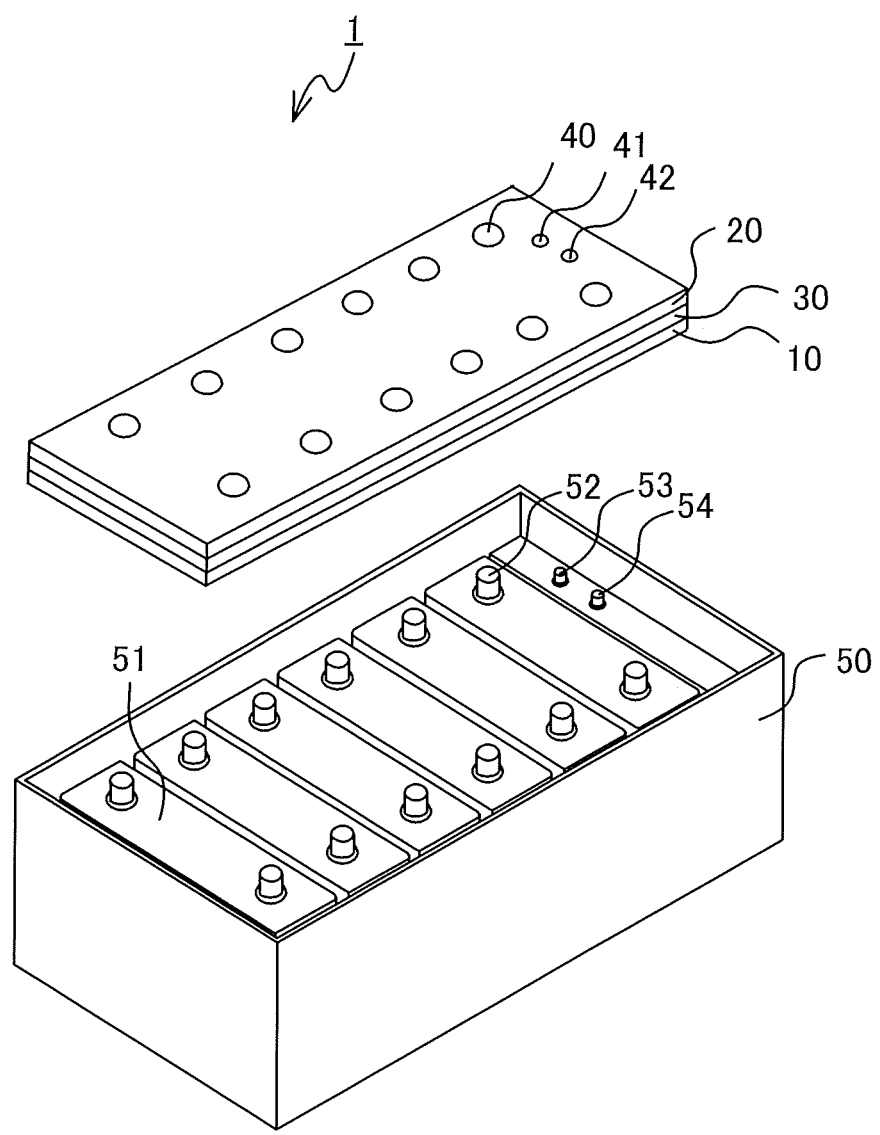
FIG. 1 is a perspective view of a storage battery module according to Embodiment 1 of the present disclosure.

FIG. 1 is a perspective view of a storage battery module according to Embodiment 1 of the present disclosure. A storage battery module 1 includes battery cells 51 that are stored inside a housing 50, a first plate-shaped member 10 having a conductor formed therein for electrically connecting terminals 52 of the battery cells 51 and a second plate-shaped member 20 opposing the first plate-shaped member 10 across an insulating member 30, the second plate-shaped member 20 having a heat dispersion region that is described further below. In an example of FIG. 1, although the storage battery module 1 is equipped with six battery cells, the number of battery cells 51 may be any number equal to or greater than two. The storage battery module 1 has through-holes 40, 41, and 42 formed therein that extend through the first plate-shaped member 10, the insulating member 30, and the second plate-shaped member 20. The terminals 52 of the battery cell 51 are inserted through each of the through-holes 40. A positive terminal 53 of the storage battery module 1 is inserted through the through-hole 41. A negative terminal 54 of the storage battery module 1 is inserted through the through-hole 42.

The insulating member 30 has a thickness that is less than or equal to a first threshold in a direction perpendicular to the main surface of the first plate-shaped member 10. The first threshold can be determined in accordance with a heat amount generated in the conductor formed on the first plate-shaped member 10, and a characteristic of a material forming the insulating member 30. At least a portion of the conductor formed on the first plate-shaped member 10 opposes a heat dispersion region of the second plate-shaped member 20 across the insulating member 30. The insulating member 30 transfers heat, transferred from the conductor of the first plate-shaped member 10, to the heat dispersion region of the second plate-shaped member 20, in a state where the conductor of the first plate-shaped member 10 and the heat dispersion region of the second plate-shaped member 20 are insulated from each other. Making the insulating member 30 that separates the first plate-shaped member 10 and the second plate-shaped member 20 from each other have a thickness that is less than or equal to the first threshold, enables heat that is generated in the first plate-shaped member 10 to be transferred to the heat dispersion region of the second plate-shaped member 20 thereby causing the heat to be dispersed inside the heat dispersion region. By causing the heat to be dispersed inside the heat dispersion region, a variance in temperature among the battery cells 51 can be suppressed or prevented. Making the thickness of the insulating member 30 thinner while maintaining a state in which the conductor of the first plate-shaped member 10 and the heat dispersion region of the second plate-shaped member 20 are insulated from each other enables the heat that is generated by the conductor of the first plate-shaped member 10 to be efficiently transferred to the heat dispersion region of the second plate-shaped member 20.

Figure 2:
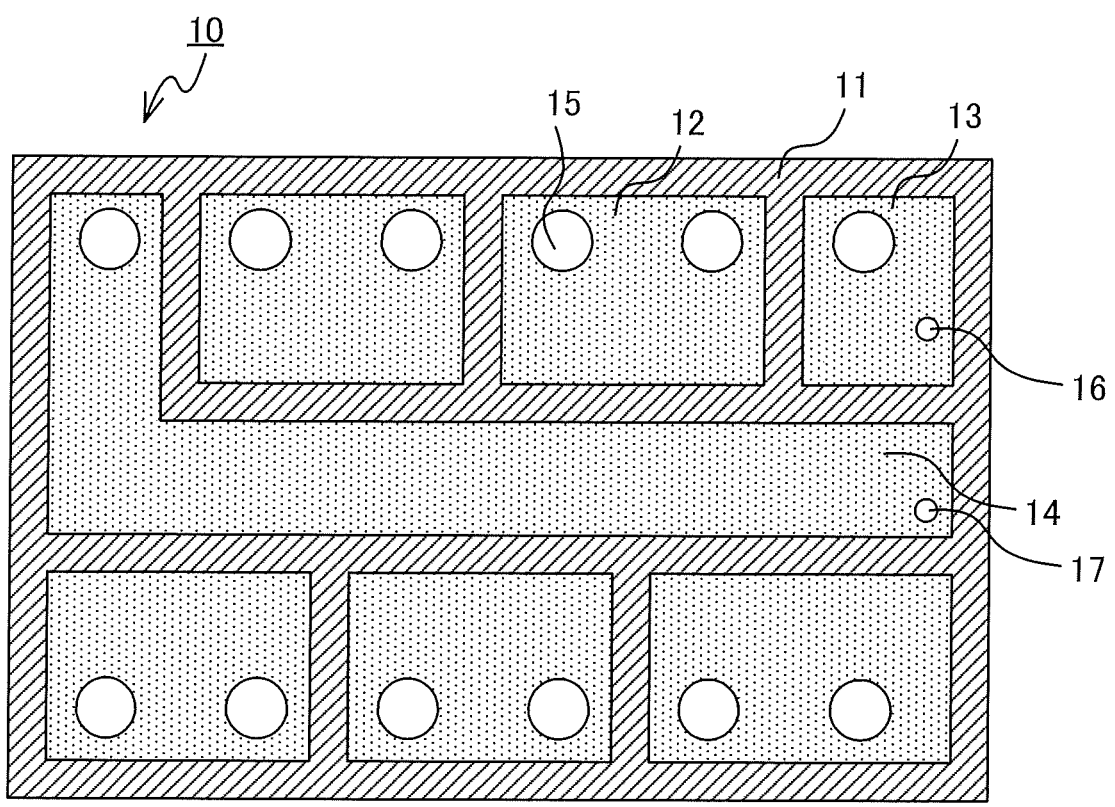
FIG. 2 is a plan view illustrating a first plate-shaped member according to Embodiment 1.

In Embodiment 1, the first plate-shaped member 10, the insulating member 30, and the second plate-shaped member 20 are preferably included in a single multi-layer print substrate. FIG. 2 is a plan view illustrating the first plate-shaped member according to Embodiment 1. The first plate-shaped member 10 has through-holes 15 through which the terminals 52 of the battery cells 51 are inserted, a through-hole 16 through which the positive terminal 53 is inserted, and a through-hole 17 through which the negative terminal 54 is inserted. In FIG. 2, the area indicated with diagonal lines is a first insulator 11 and the areas indicated with dots are first connecting conductors 12, and conductors 13 and 14. The first connecting conductor 12 electrically connects together the terminals 52 of the battery cells 51 that are adjacent to each other. The first connecting conductors 12 are separated from each other by the first insulator 11. The conductor 13 electrically connects the positive terminal 53 inserted through the through-hole 16 and to the terminal 52 of the battery cell 51 inserted through the through-hole 15. The conductor 14 electrically connects the negative terminal 54 inserted through through-hole 17 and the terminal 52 of the battery cell 51 inserted through the through-hole 15. The first connecting conductors 12, the conductor 13, and the conductor 14 are separated from one another by the first insulator 11.

Figure 3:
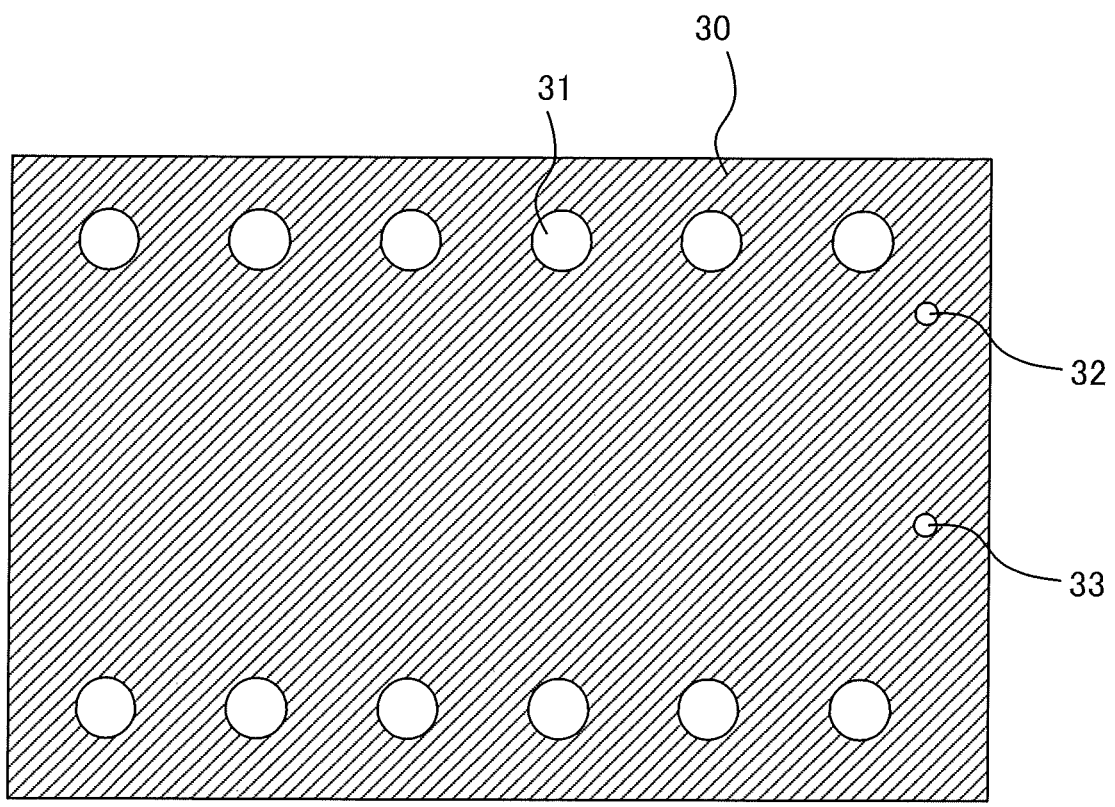
FIG. 3 is a plan view illustrating an insulating member according to Embodiment 1.

FIG. 3 is a plan view illustrating an insulating member according to Embodiment 1. In FIG. 3, the insulating member 30 indicated with diagonal lines has through-holes 31 through which the terminals 52 of the battery cells 51 are inserted, a through-hole 32 through which the positive terminal 53 is inserted, and a through-hole 33 through which the negative terminal 54 is inserted.

Figure 4:
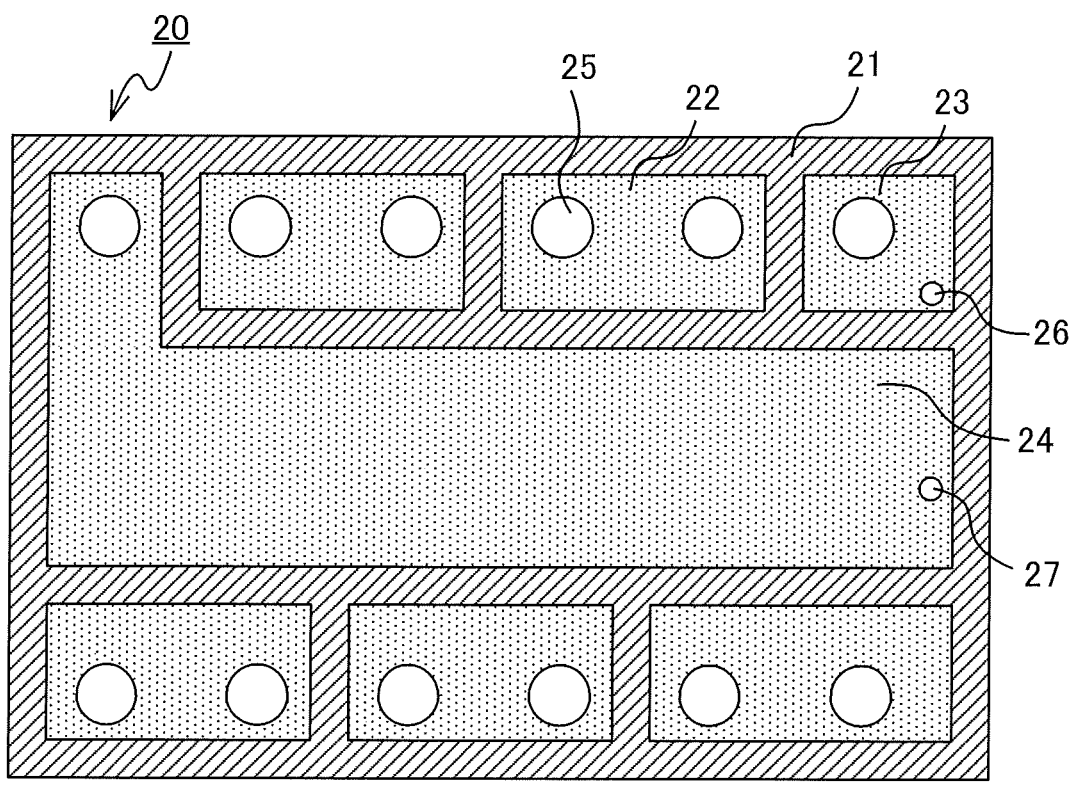
FIG. 4 is a plan view illustrating a second plate-shaped member according to Embodiment 1.

FIG. 4 is a plan view illustrating a second plate-shaped member according to Embodiment 1. The second plate-shaped member 20 has through-holes 25 through which the terminals 52 of the battery cells 51 are inserted, a through-hole 26 through which the positive terminal 53 is inserted, and a through-hole 27 through which the negative terminal 54 is inserted. In FIG. 4, the area indicated with diagonal lines is a second insulator 21, and the areas indicated with dots are second connecting conductors 22, and conductors 23 and 24. The second connecting conductor 22 electrically connects together the terminals 52 of the battery cells 51 that are adjacent to each other. The second connecting conductors 22 are separated from one another by the second insulator 21. The conductor 23 electrically connects the positive terminal 53 that is inserted through the through-hole 26 and the terminal 52 of the battery cell 51 inserted through through-hole 25. The conductor 24 electrically connects the negative terminal 54 inserted through through-hole 27 and the terminals 52 of the battery cell 51 inserted through through-holes 25. The second connecting conductors 22, the conductor 23, and the conductor 24 are separated from one another by the second insulator 21.

The conductor 24 is a heat dispersion region, and as described below, the conductor 24 disperses heat transferred from the first connecting conductors 12 as well as the conductors 13 and 14 of the opposing first plate-shaped member 10 to the inside the heat dispersion region. The second connecting conductors 22 are smaller than the first connecting conductors 12 so that the conductor 24 opposes at least a portion of the first connecting conductors 12. The conductor 24 is a member that has thermal conductivity that is greater than or equal to a second threshold. The second threshold can determine in accordance with a heat amount generated by the first plate-shaped member 10. In Embodiment 1, the conductor 24 is copper.

Through-holes 15, 25, and 31 together constitute each of the through-holes 40, through-holes 16, 26, and 32 together constitute the through-hole 41, and through-holes 17, 27, and 33 together constitute the through-hole 42. A circuit connecting the battery cells 51 in series is formed by fixing the first plate-shaped member 10, the insulating member 30, and the second plate-shaped member 20 together in a state where the terminals 52 of the battery cells 51 are inserted through the through-holes 40, the positive terminal 53 is inserted through the through-hole 41, and the negative terminal 54 is inserted through the through-hole 42.

Figure 5:
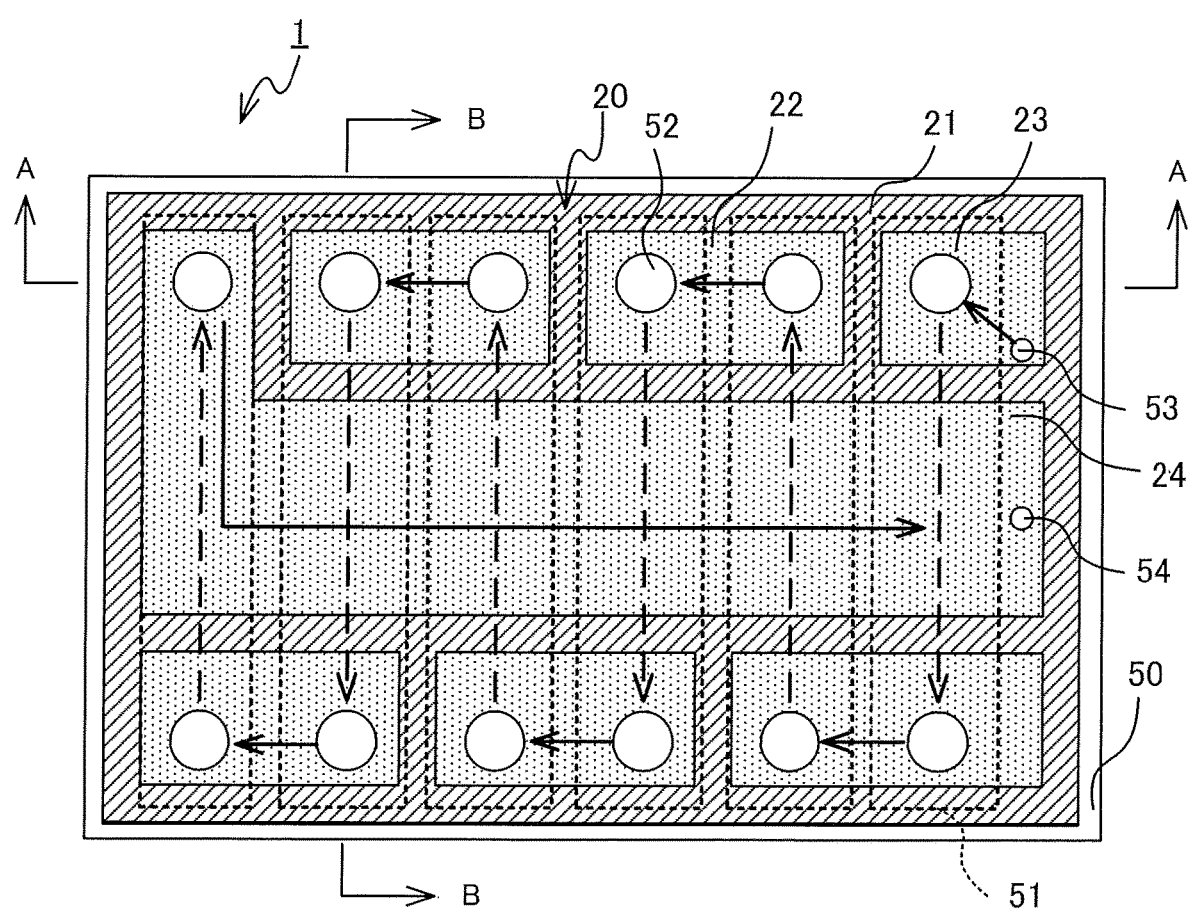
FIG. 5 is a plan view of the storage battery module according to Embodiment 1.

FIG. 5 is a plan view of the storage battery module according to Embodiment 1. In FIG. 5, solid-line arrows indicate current flow in the second connecting conductors 22, the conductors 23 and 24 that are in the second plate-shaped member 20, and dashed arrows indicate the current flow within the battery cells 51. Current flows from the positive terminal 53, via the conductor 23 and the terminal 52, to the battery cell 51 situated on the right end of FIG. 5. Current flowing inside the battery cell 51 then enters the adjacent battery cell 51 via the terminal 52 and the second connecting conductor 22. In this manner, current flows from the battery cell 51 situated on the right end of FIG. 5 to the battery cell 51 situated on the left end of FIG. 5. The current flows from the terminal 52 of the battery cell 51 situated on the left end of FIG. 5 to the negative terminal 54 via the conductor 24. Current flows in a similar manner in the first plate-shaped member 10. Current flowing as described above causes the temperature around the battery cells 51 that are situated in the center of the storage battery module 1 to get higher than other areas inside the storage battery module 1.

Figure 6:
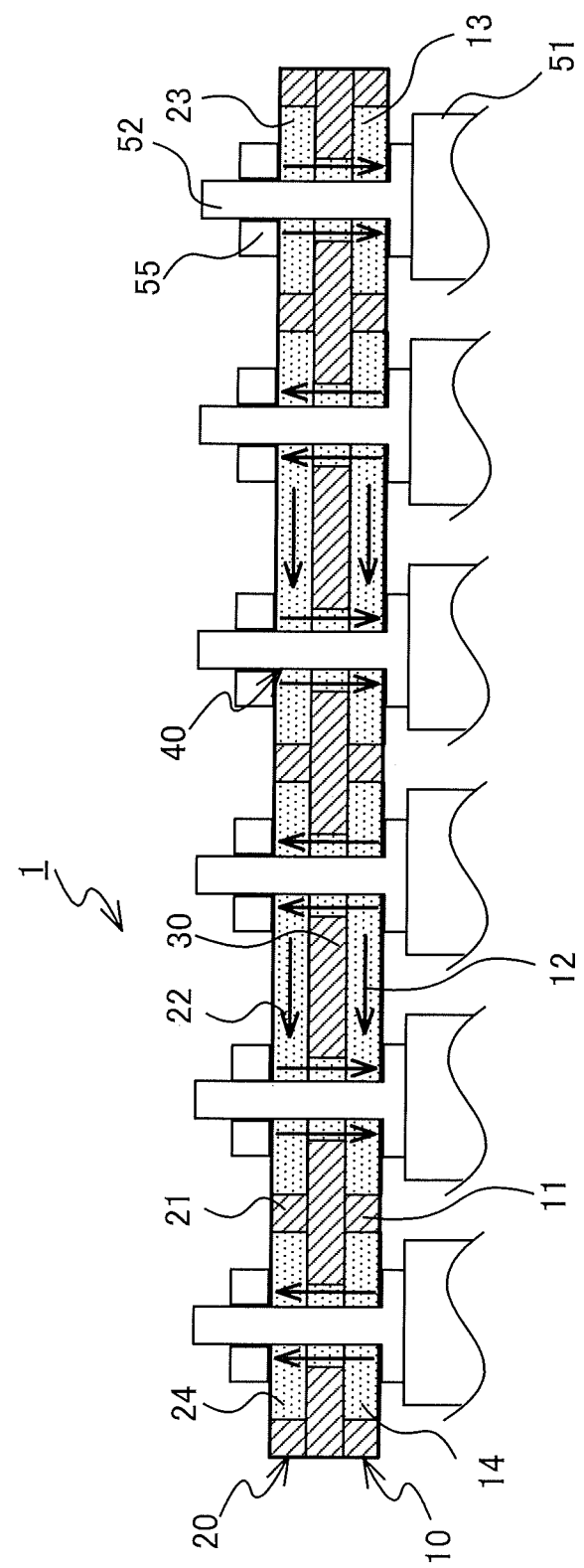
FIG. 6 is a partial cross-sectional view of the storage battery module according to Embodiment 1.

FIG. 6 is a partial cross-sectional view of the storage battery module according to Embodiment 1. FIG. 6 is a portion of a cross-sectional view taken along A-A line in FIG. 5. A single-sheet substrate is formed in order of the first plate-shaped member 10, the insulating member 30, and the second plate-shaped member 20, and this substrate is fixed to the terminals 52 of the battery cells 51 by nuts 55. In FIG. 6, the areas indicated with diagonal lines are the first insulator 11, the second insulator 21, and the insulating member 30, and the areas indicated with dots are the first connecting conductors 12, the second connecting conductors 22, and conductors 13, 14, 23, and 24. In FIG. 6, solid-line arrows indicate current flow. In the example of FIG. 6, the through-holes 40 are through-hole conductors, and the first connecting conductor 12 and the second connecting conductor 22 that electrically connect the same adjacent terminals 52 of the battery cells 51 are conductive. The first connecting conductor 12 and the second connecting conductor 22 that electrically connect the same adjacent terminals 52 of the battery cells 51 may be insulated by the insulating member 30. In such a case, the current flowing inside the battery cell 51 branches from the terminal 52 into the first connecting conductor 12 and into the second connecting conductor 22, and then enters the adjacent battery cell 51. Likewise, the conductor 13 and the conductor 23 may be conductive, or may be insulated from each other by the insulating member 30. Moreover, the conductor 14 and the conductor 24 may be conductive, or may be insulated from each other by the insulating member 30.

Figure 7:
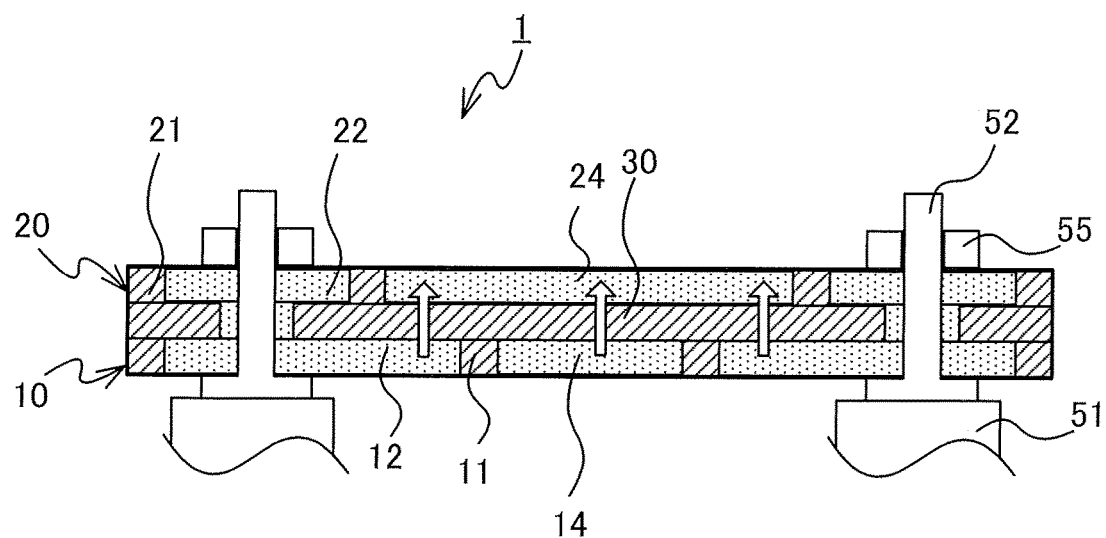
FIG. 7 is a partial cross-sectional view of the storage battery module according to Embodiment 1.

FIG. 7 is a partial cross-sectional view of the storage battery module according to Embodiment 1. FIG. 7 is a cross-sectional view taken along B-B line in FIG. 5. FIG. 7 is oriented in a manner similar to that of FIG. 6. The first connecting conductor 12 and the conductor 24 that is the heat dispersion region oppose each other across the insulating member 30, and the conductor 14 and the conductor 24 oppose each other across the insulating member 30. As indicated by solid white arrows in FIG. 7, the heat generated by the first connecting conductors 12 is transferred to the conductor 24 via the insulating member 30 and then the heat is dispersed inside the conductor 24. Therefore, a variance in temperature among the battery cells 51 can be suppressed or prevented.

Figure 8:
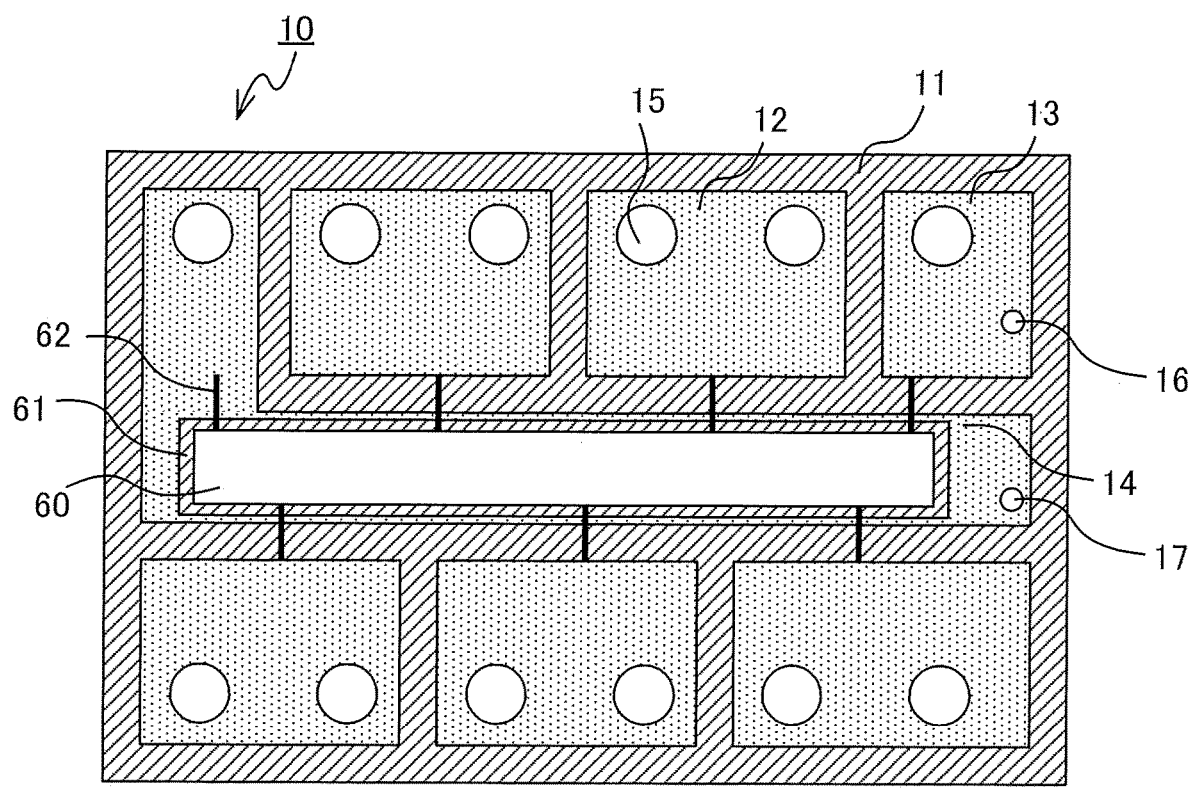
FIG. 8 is a plan view illustrating the first plate-shaped member according to Embodiment 1.

FIG. 8 is a plan view illustrating the first plate-shaped member according to Embodiment 1. In the example of FIG. 8, the first plate-shaped member 10 has a control circuit 60 formed therein. The control circuit 60 and the conductor 14 are separated from each other by an insulator 61. The control circuit 60 is connected with each of the first connecting conductors 12 and each of the conductors 13 and 14 by a voltage measurement patter 62. The control circuit 60 measures electric potentials of the first connecting conductors 12 and the conductors 13 and 14 that are acquired via the voltage measurement pattern 62, and performs control making all of the battery cells 51 have the same voltage based on the measured electric potential.

As described above, by providing the first plate-shaped member 10 and the second plate-shaped member 20 equipped with a heat dispersion region that causes heat transferred from the first connecting conductors 12 to disperse into the heat dispersion region, the storage battery module 1 according to Embodiment 1 can suppress or prevent a variance in temperature among the battery cells 51. Since a variance in temperature among the battery cells 51 can be suppressed or prevented, the lifespan of the storage battery module 1 can be prolonged. Moreover, the use of rigid substrates such as the first plate-shaped member 10 and the second plate-shaped member 20 instead of flexible Flexible Printed Circuits (FPC) can minimize the possibility of a short circuit caused by a worker accidently touching certain areas. Also, manufacturing costs can be minimized by using rigid substrates such as the first plate-shaped member 10 and the second plate-shaped member 20 instead of FPC substrates that have high initial costs due to the need for dedicated mold.

Embodiment 2

Figure 9:
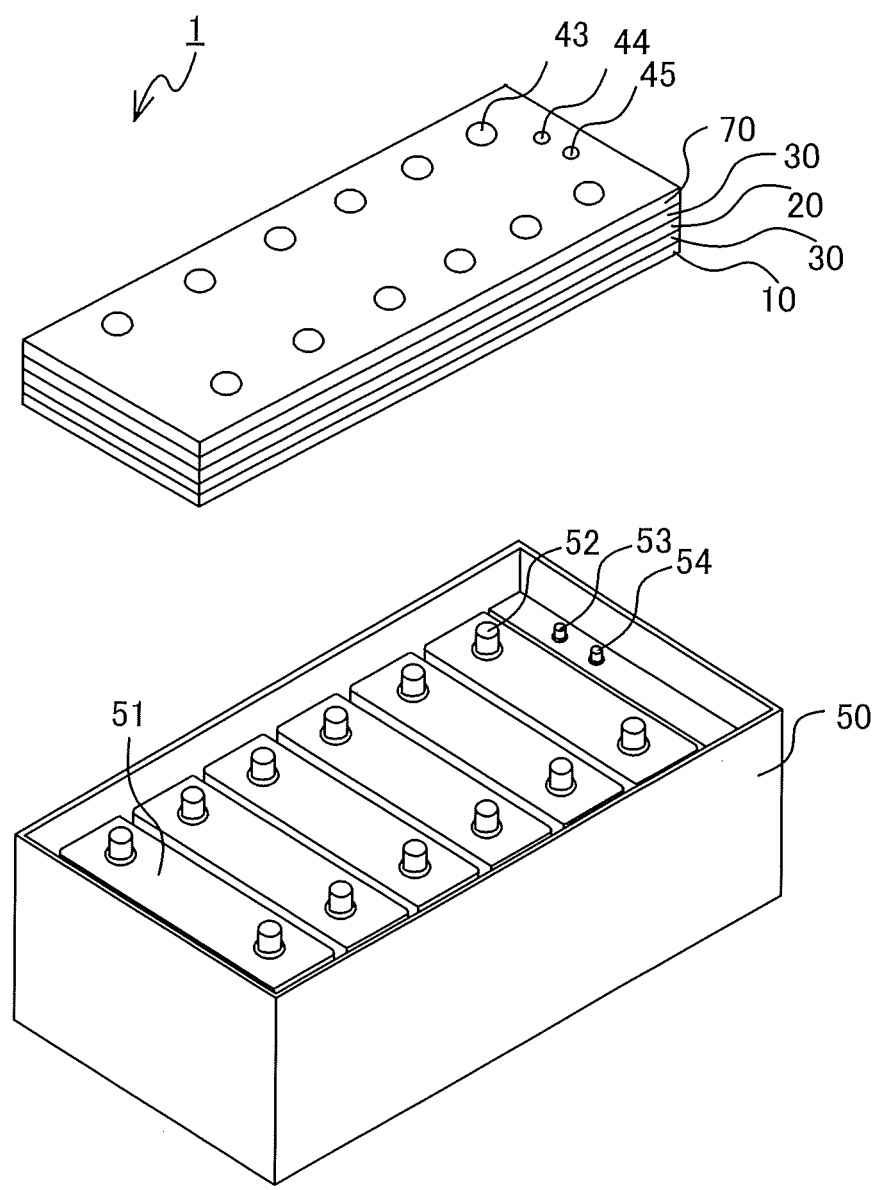
FIG. 9 is a perspective view of a storage battery module according to Embodiment 2 of the present disclosure.

FIG. 9 is a perspective view of a storage battery module according to Embodiment 2 of the present disclosure. The storage battery module 1 according to Embodiment 2 having the configuration in Embodiment 1 also includes a third plate-shaped member 70 that opposes the second plate-shaped member 20 across the insulating member 30. The storage battery module 1 of Embodiment 2 has through-holes 43, 44, and 45 formed therein that extend through the first plate-shaped member 10, the second plate-shaped member 20, the insulating member 30, and the third plate-shaped member 70. The terminals 52 of the battery cell 51 are inserted through the through-holes 43. The positive terminal 53 is inserted through the through-hole 44. The negative terminal 54 is inserted through the through-hole 45. In Embodiment 2, the first plate-shaped member 10, the second plate-shaped member 20, the third plate-shaped member 70, and the insulating member 30 are included in a single multi-layer print substrate.

Figure 10:
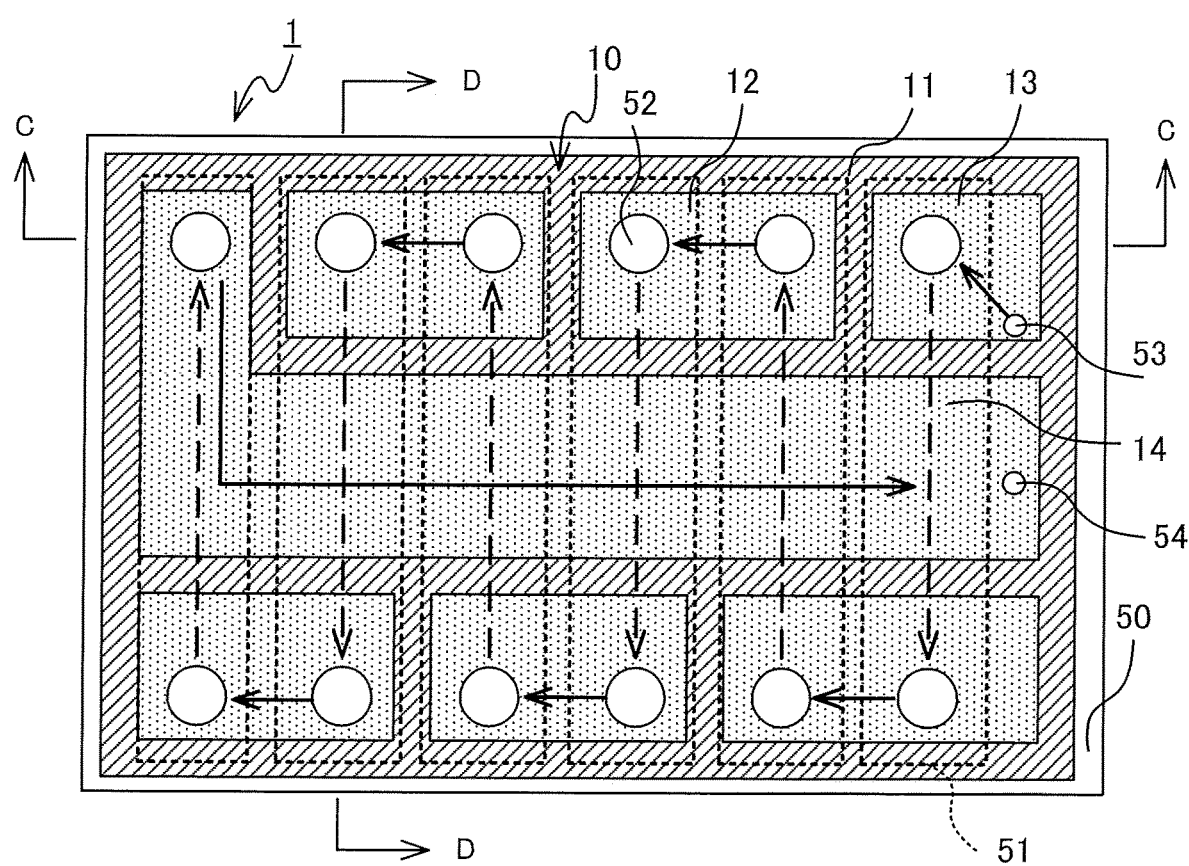
FIG. 10 is a plan view of the storage battery module according to Embodiment 2.
Figure 11:
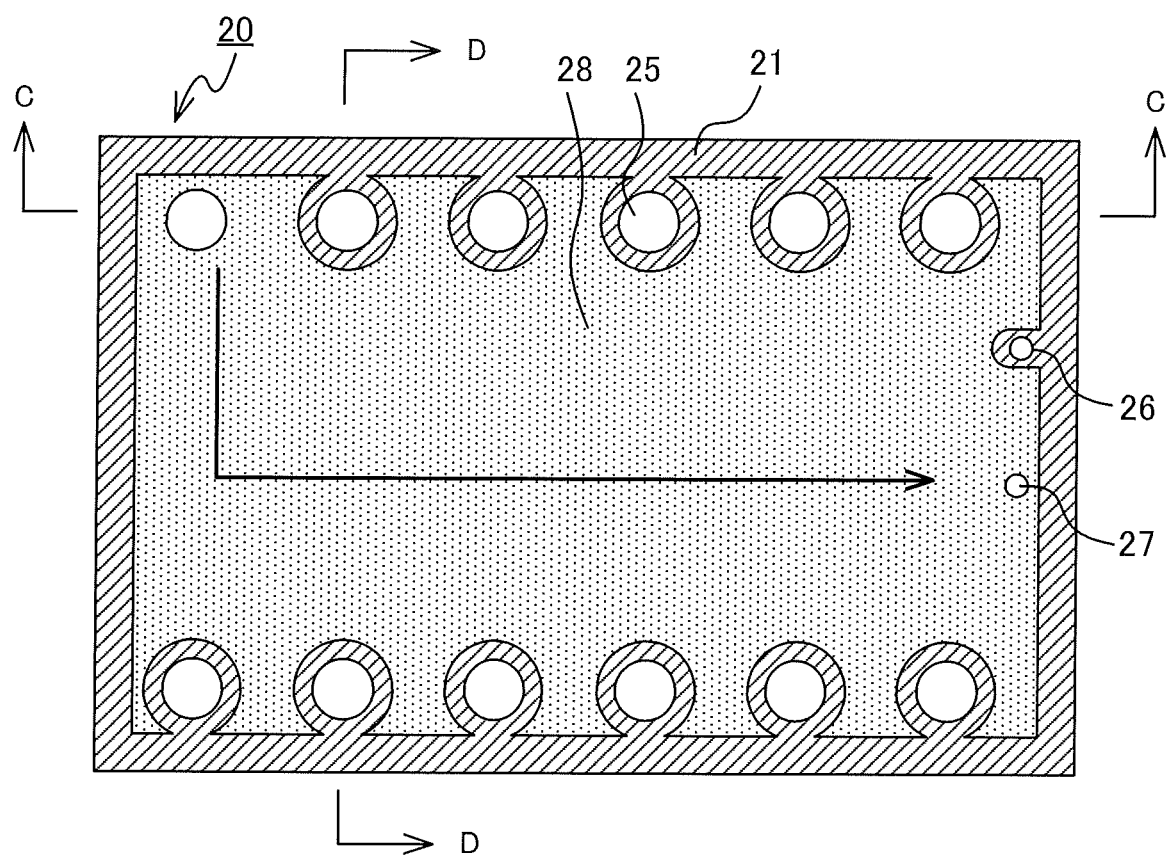
FIG. 11 is a plan view illustrating a second plate-shaped member according to Embodiment 2.

FIG. 10 is a plan view of the storage battery module according to Embodiment 2. In FIG. 10, the second plate-shaped member 20, the insulating member 30, and the third plate-shaped member 70 are omitted. The sizes of the first connecting conductors 12 and the conductors 13 and 14 of the first plate-shaped member 10 according to Embodiment 2 are different from those in Embodiment 1. The manner in which current flows in the first plate-shaped member 10 is similar to that in Embodiment 1. FIG. 11 is a plan view illustrating the second plate-shaped member according to Embodiment 2. The second plate-shaped member 20 has through-holes 25, 26, and 27 formed therein similar to that in Embodiment 1. In FIG. 11, the area indicated with diagonal lines is the second insulator 21, and the area indicated with dots is a conductor 28. The conductor 28 is a heat dispersion region, and electrically connects the terminal 52 of the battery cell 51 inserted through the through-hole 25 of the conductor 28 to the negative terminal 54 inserted through the through-hole 27. In FIG. 11, a solid-line arrow indicates current flow within the conductor 28 in the second plate-shaped member 20. In the example of FIG. 11, with exception to the terminal 52 that is electrically connected to the negative terminal 54, the conductor 28 is separated from the terminals 52 by the second insulator 21.

Figure 12:
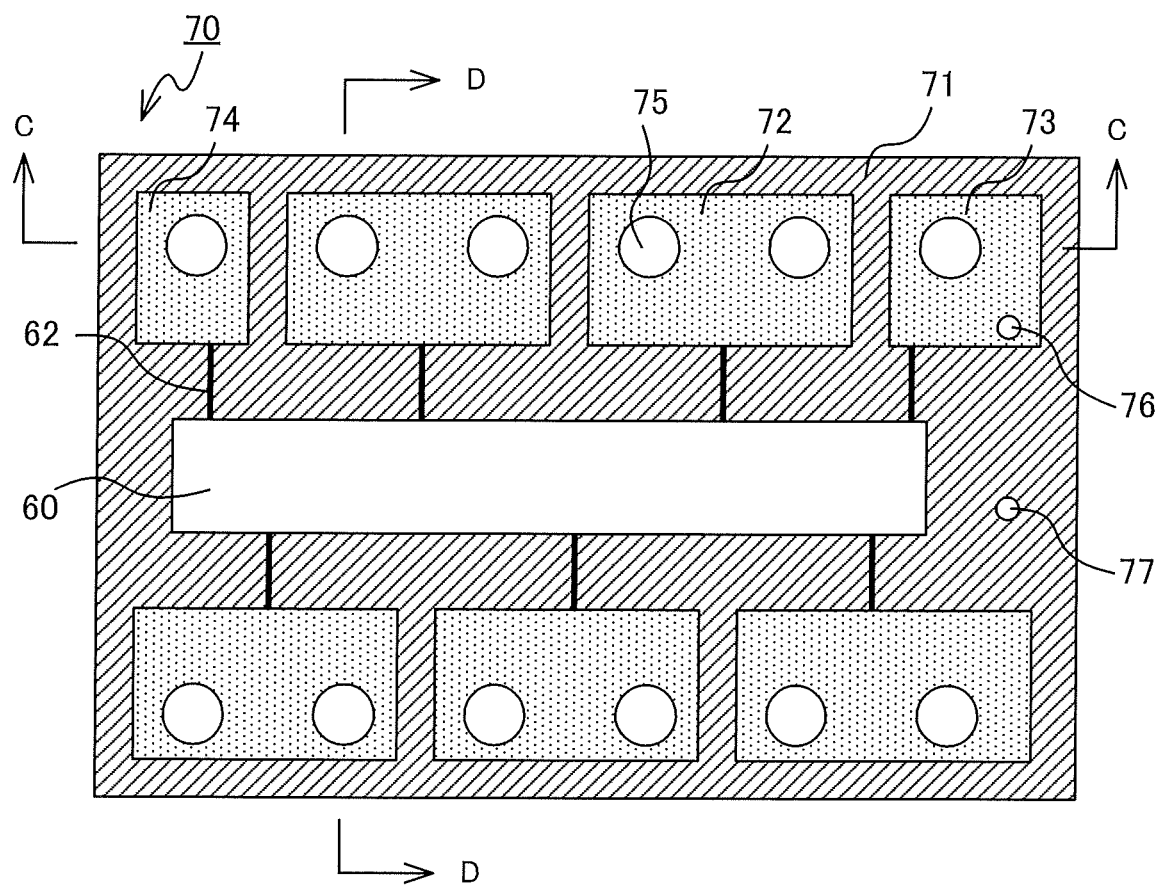
FIG. 12 is a plan view illustrating a third plate-shaped member according to Embodiment 2.

FIG. 12 is a plan view illustrating a third plate-shaped member according to Embodiment 2. In FIG. 12, the area indicated with diagonal lines is an insulator 71 and the areas indicated with dots are conductors 72, 73, and 74. The third plate-shaped member 70 has (i) through-holes 75 through which the terminals 52 of the battery cells 51 are inserted, (ii) a through-hole 76 through which the positive terminal 53 is inserted, and (iii) a through-hole 77 through which negative terminal 54 is inserted, formed therein. The conductor 72 electrically connects together the terminals 52 of the battery cells 51 that are adjacent to each other. The size of the conductors 72 is the same as the size of the first connecting conductor 12. The conductor 73 electrically connects the positive terminal 53 inserted through the through-hole 76 with the terminals 52 of the battery cells 51. The third plate-shaped member 70 has the control circuit 60 formed therein. The control circuit 60 is connected with each of the conductors 72, 73, 74 by the voltage measurement pattern 62. The control circuit 60 measures electric potentials of the conductors 72, 73, and 74 acquired via the voltage measurement pattern 62, and performs control making all of the battery cells 51 have the same voltage based on the measured electric potentials.

The through-holes 15, 25, 31, and 75 together constitute each of the through-holes 43, the through-holes 16, 26, 32, and 76 together constitute the through-hole 44, and the through-holes 17, 27, 33, and 77 together constitute the through-hole 45. A circuit connecting the battery cells 51 in series is formed by fixing together the members in order of the first plate-shaped member 10, the insulating member 30, the second plate-shaped member 20, the insulating member 30, and the third plate-shaped member 70, in a state where the terminals 52 of the battery cells 51 are inserted through the through-holes 43, the positive terminal 53 is inserted through the through-hole 44, and the negative terminal 54 is inserted through the through-hole 45.

Figure 13:
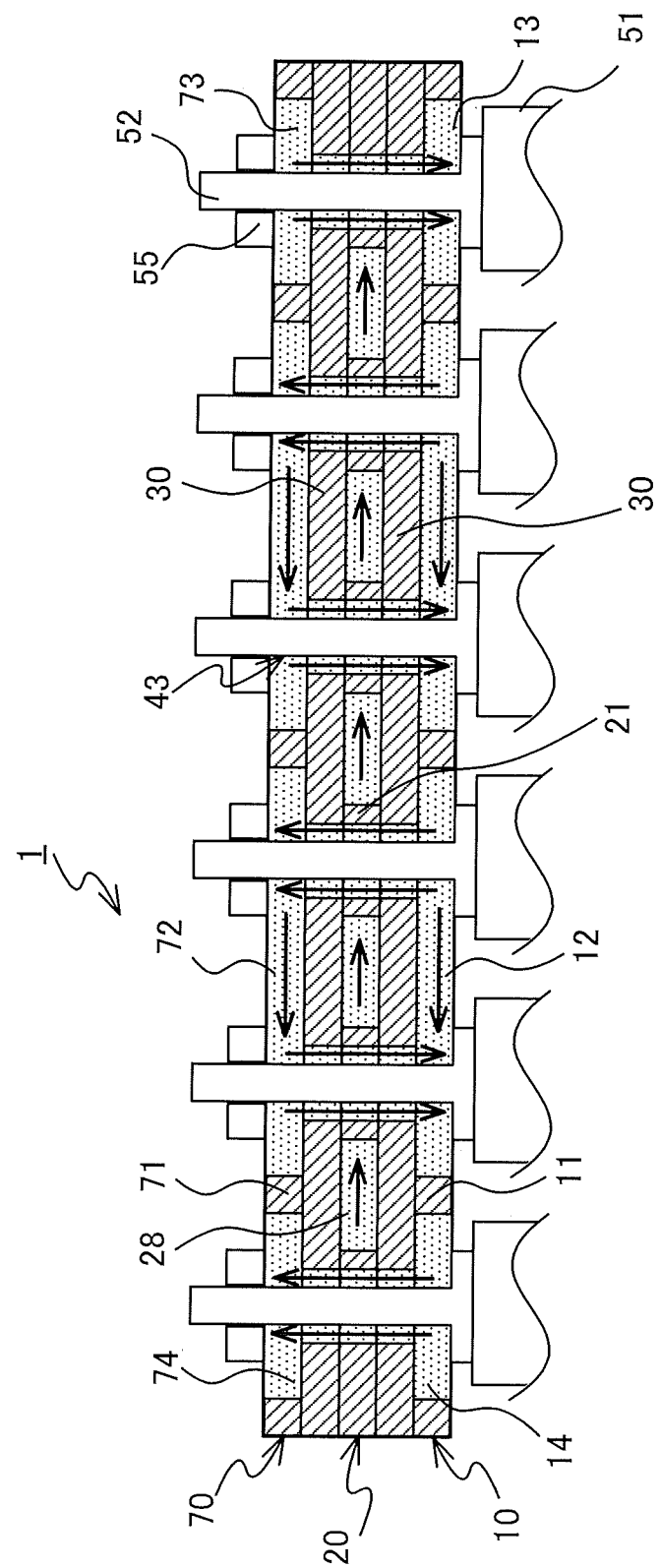
FIG. 13 is a partial cross-sectional view of the storage battery module according to Embodiment 2.

FIG. 13 is a partial cross-sectional view of the storage battery module according to Embodiment 2. FIG. 13 is a portion of a cross-sectional view of the storage battery module 1 taken along C-C line in FIGS. 10 to 12. In order of the first plate-shaped member 10, the insulating member 30, the second plate-shaped member 20, the insulating member 30, and the third plate-shaped member 70, these members are stacked and then fixed to the terminals 52 of the battery cells 51 by the nuts 55. In FIG. 13, the areas indicated with diagonal lines are the first insulator 11, the second insulator 21, the insulating member 30, and the insulator 71, and the areas indicated with dots are the first connecting conductors 12, and the conductors 13, 14, 28, 72, 73, and 74. In FIG. 13, solid-line arrows indicate current flow. In the example of FIG. 13, the through-holes 43 are through-hole conductors, and the first connecting conductor 12 and the conductor 72 that electrically connect the same adjacent terminals 52 of the battery cells 51 are conductive. The first connecting conductor 12 and the conductor 72 that electrically connect the same adjacent terminals 52 of the battery cells 51 may be insulated by the insulating member 30. In such a case, the current flowing inside the battery cell 51 branches from the terminal 52 into the conductor 12 and into the conductor 72, and then enters the adjacent battery cell 51. Likewise, the conductor 13 and the conductor 73 may be conductive, or may be insulated from each other by the insulating member 30. Moreover, the conductor 14 and the conductor 74 may be conductive, and or may be insulated from each other by the insulating member 30.

Figure 14:
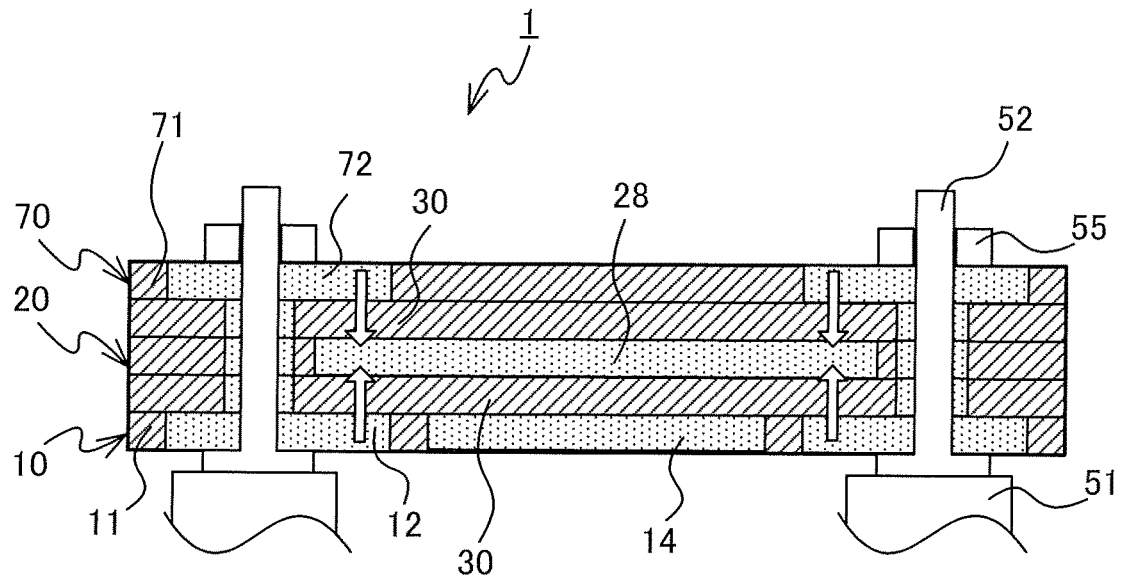
FIG. 14 is a partial cross-sectional view of the storage battery module according to Embodiment 2.

FIG. 14 is a partial cross-sectional view of the storage battery module according to Embodiment 2. FIG. 14 is a portion of the cross-sectional view of the storage battery module 1 taken along D-D line in FIGS. 10 to 12. FIG. 14 is oriented in a manner similar to that of FIG. 13. The first connecting conductor 12 and the conductor 28 oppose each other across the insulating member 30, and the conductor 72 and the conductor 28 oppose each other across the insulating member 30. As indicated by the solid white arrows in FIG. 14, heat generated by the first connecting conductor 12 is transferred to the conductor 28 via the insulating member 30 and then the heat is dispersed inside the conductor 28. Therefore, a variance in temperature among the battery cells 51 can be suppressed or prevented.

Figure 15:
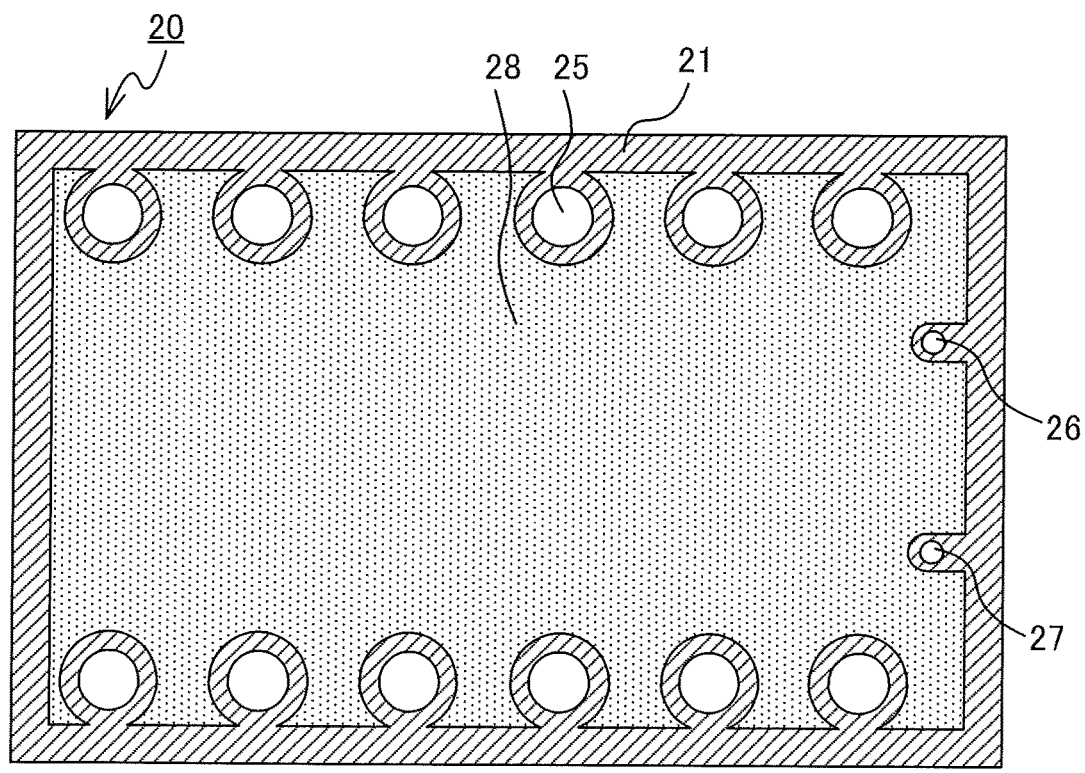
FIG. 15 is another plan view illustrating the second plate-shaped member according to Embodiment 2.

FIG. 15 is another plan view illustrating the second plate-shaped member according to Embodiment 2. The conductor 28 and all of the terminals 52 of the battery cells 51 inserted through the through-holes 25 can be separated from one another by the second insulator 21.

As described above, by providing the first plate-shaped member 10 and the second plate-shaped member 20 equipped with a heat dispersion region that causes heat transferred from the first connecting conductors 12 to disperse into the heat dispersion region, the storage battery module 1 according to Embodiment 2 can suppress or prevent a variance in temperature among the battery cells 51. Since a variance in temperature among the battery cells 51 can be suppressed or prevented, the lifespan of the storage battery module 1 can be prolonged. Since the conductor 28 has a surface area that is greater than a surface area of the conductor 24, heat generated by the first connecting conductors 12 can be dispersed even more efficiently than that in Embodiment 1.

Embodiment 3

Figure 16:
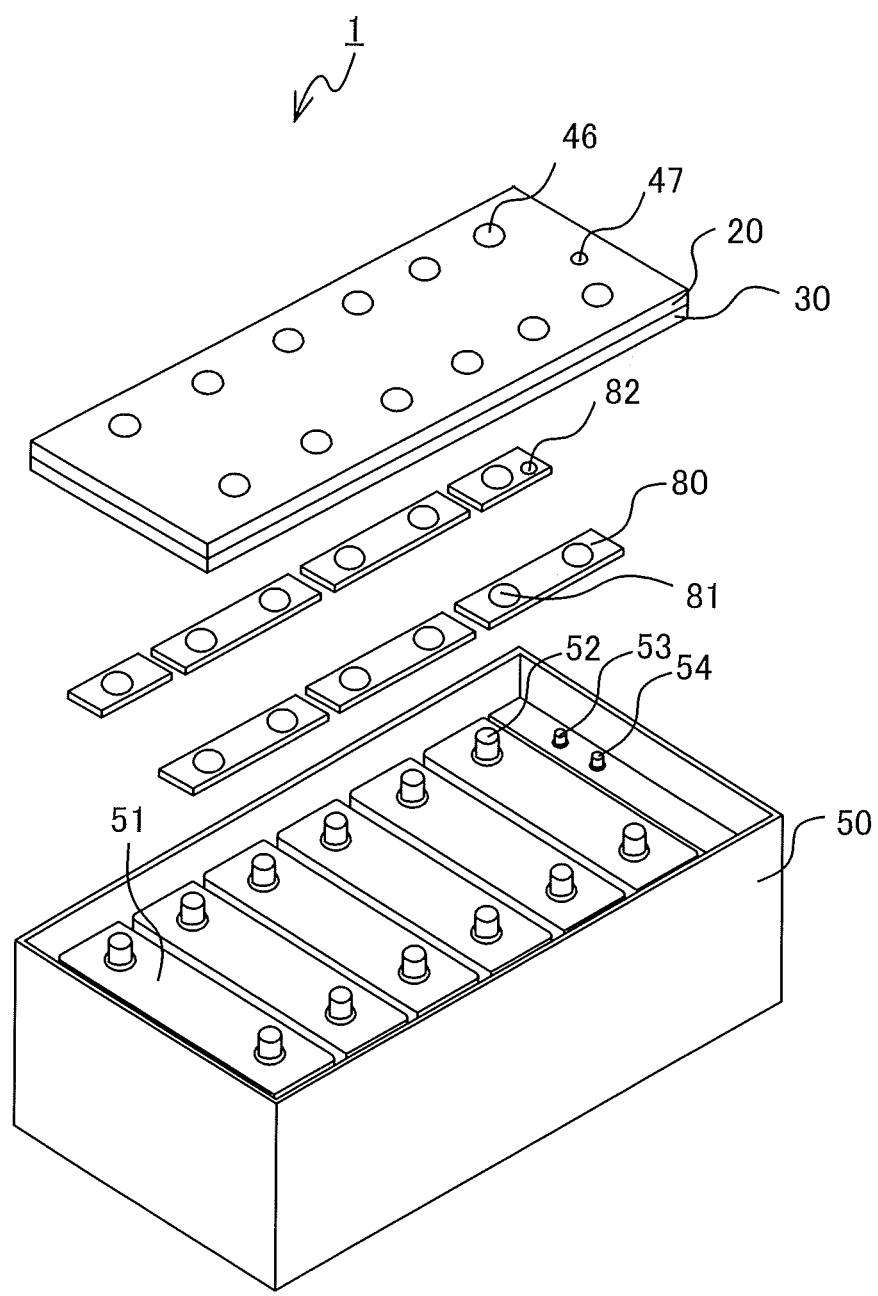
FIG. 16 is a perspective view of a storage battery module according to Embodiment 3 of the present disclosure.

FIG. 16 is a perspective view of a storage battery module according to Embodiment 3 of the present disclosure. The storage battery module 1 according to Embodiment 3 includes multiple first plate-shaped members 80 that are copper substrates. The first plate-shaped members 80 have through-holes 81 through which the terminals 52 of the battery cell 51 are inserted. The storage battery module 1 according to Embodiment 3 has through-holes 46 and 47 formed therein that extend through the second plate-shaped member 20 and the insulating member 30. The terminals 52 of the battery cells 51 are inserted through the through-holes 46. The negative terminal 54 is inserted through the through-hole 47. The second plate-shaped member 20 in Embodiment 3 is also a copper substrate.

Figure 17:
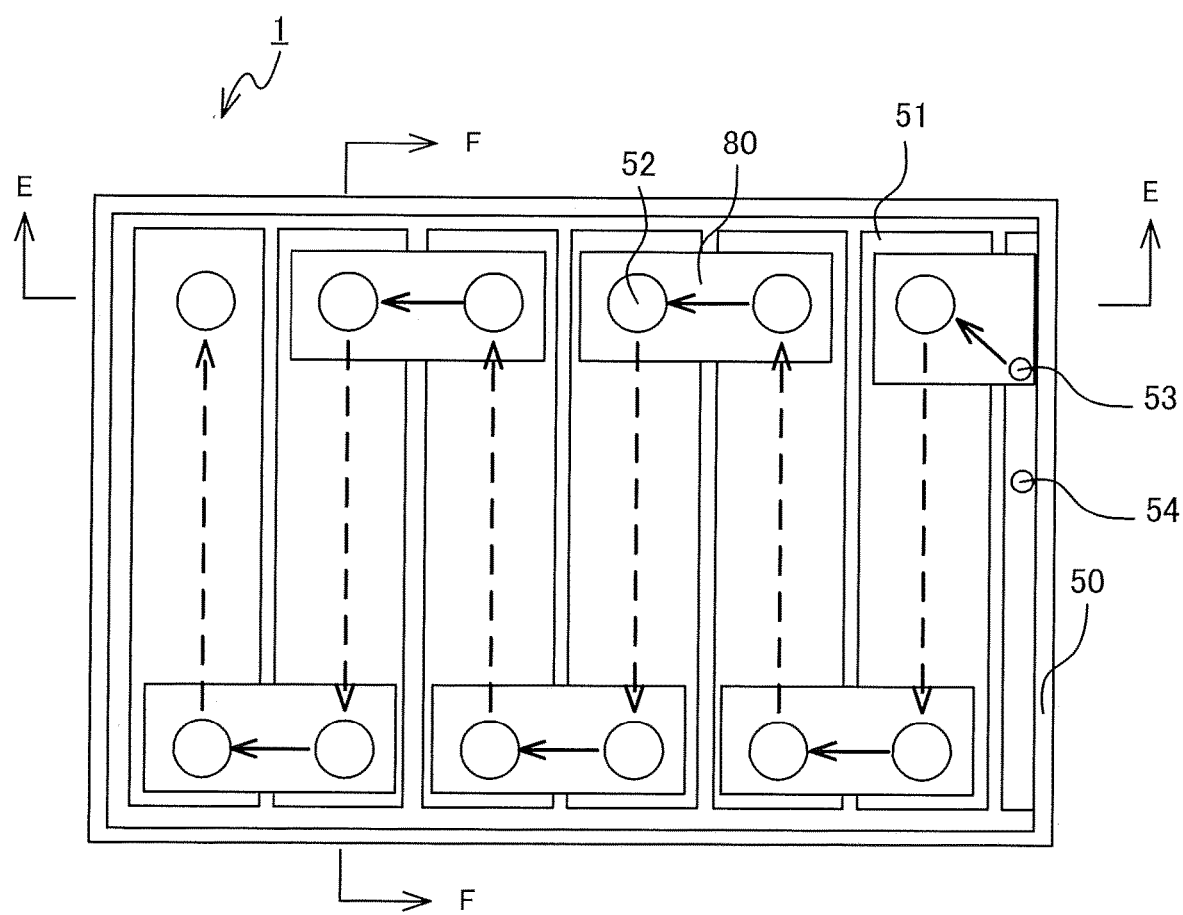
FIG. 17 is a plan view of the storage battery module according to Embodiment 3.

FIG. 17 is a plan view of the storage battery module according to Embodiment 3. In FIG. 17, the insulating member 30 and the second plate-shaped member 20 are omitted. The first plate-shaped member 80 electrically connects together the terminals 52 of the battery cells 51 that are adjacent to each other. In FIG. 17, solid-line arrows indicate current flow within the first plate-shaped members 80, and dashed arrows indicate current flow within the battery cells 51. The terminal 52 of the battery cell 51 situated on the right end of FIG. 17 is electrically connected to the positive terminal 53. Current flows from the positive terminal 53 to the battery cell 51 situated on the right end of FIG. 17. Current flowing inside the battery cell 51 then enters the adjacent battery cell 51 via the terminal 52 and the first plate-shaped member 80. In this manner, current flows from the battery cell 51 situated on the right end of FIG. 17 to the battery cell 51 situated on the left end of FIG. 17.

Figure 18:
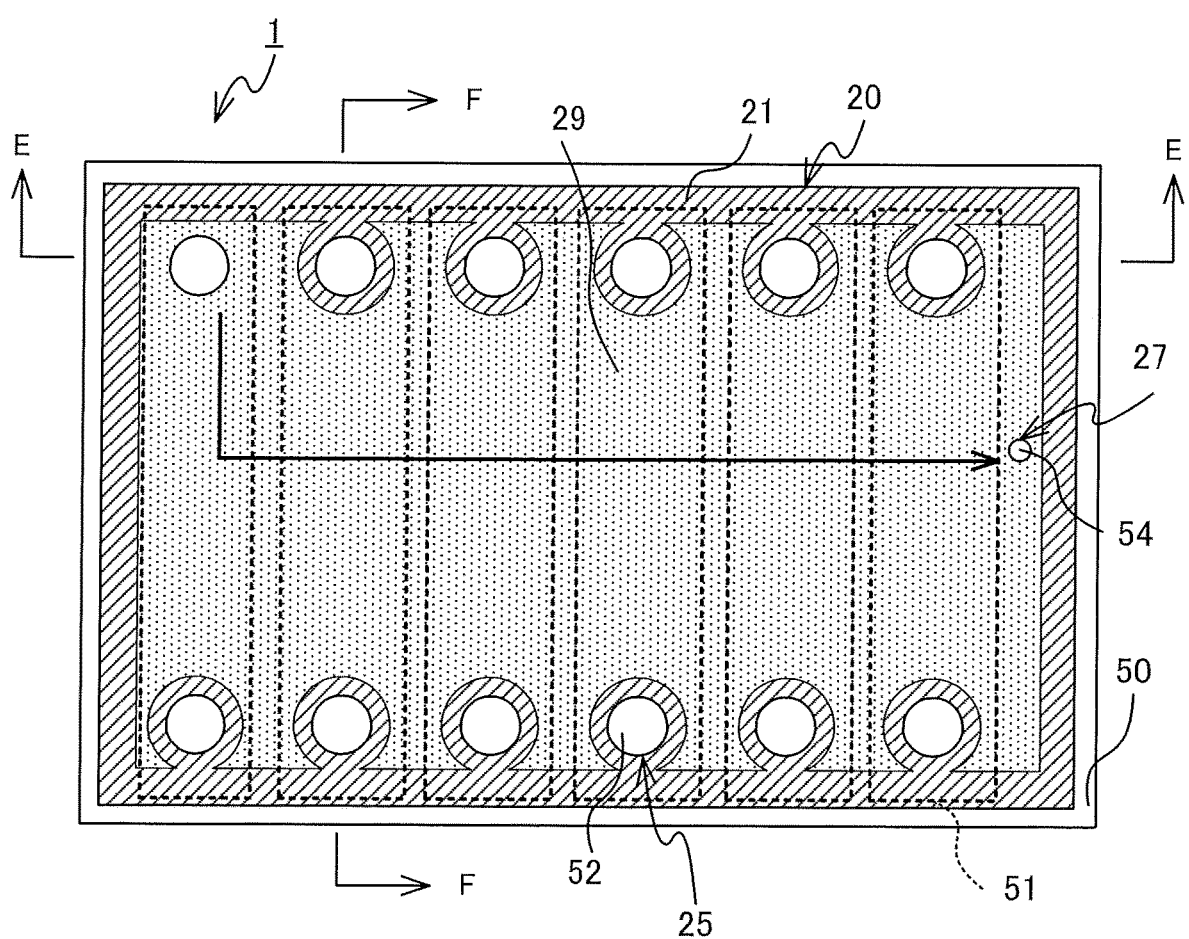
FIG. 18 is a plan view of the storage battery module according to Embodiment 3.

FIG. 18 is a plan view of the storage battery module according to Embodiment 3. The second plate-shaped member 20 has the through-holes 25 through which the terminals 52 of the battery cells 51 are inserted and the through-hole 27 through which the negative terminal 54 is inserted, formed therein. A portion of a copper substrate 29 formed on the second plate-shaped member 20 is covered by the second insulator 21. The copper substrate 29 is a heat dispersion region. The copper substrate 29 electrically connects the terminal 52 of the battery cell 51 situated on the left end of FIG. 18 and the negative terminal 54. With exception to the terminal 52 that is electrically connected to the negative terminal 54, the copper substrate 29 is separated from the terminals 52 by the second insulator 21. In FIG. 18, a solid-line arrow indicates current flow inside the copper substrate 29. Current flows from the terminal 52 of the battery cell 51 situated on the left end of FIG. 18 to the negative terminal 54 via the copper substrate 29.

Although the configuration of the insulating member 30 is similar to that in Embodiment 1, in Embodiment 3, the insulating member 30 does not have the through-hole 32 that is illustrated in FIG. 3. The through-holes 25 and 31 together constitute each of the through-holes 46 and the through-holes 27 and 33 together constitute the through-hole 47. A circuit connecting the battery cells 51 in series is formed by fixing together the members in order of the first plate-shaped members 80, the insulating member 30, and the second plate-shaped member 20, in a state where the terminals 52 of the battery cells 51 are inserted through the through-holes 81 and the through-holes 46, and the negative terminal 54 is inserted through the through-hole 47.

Figure 19:
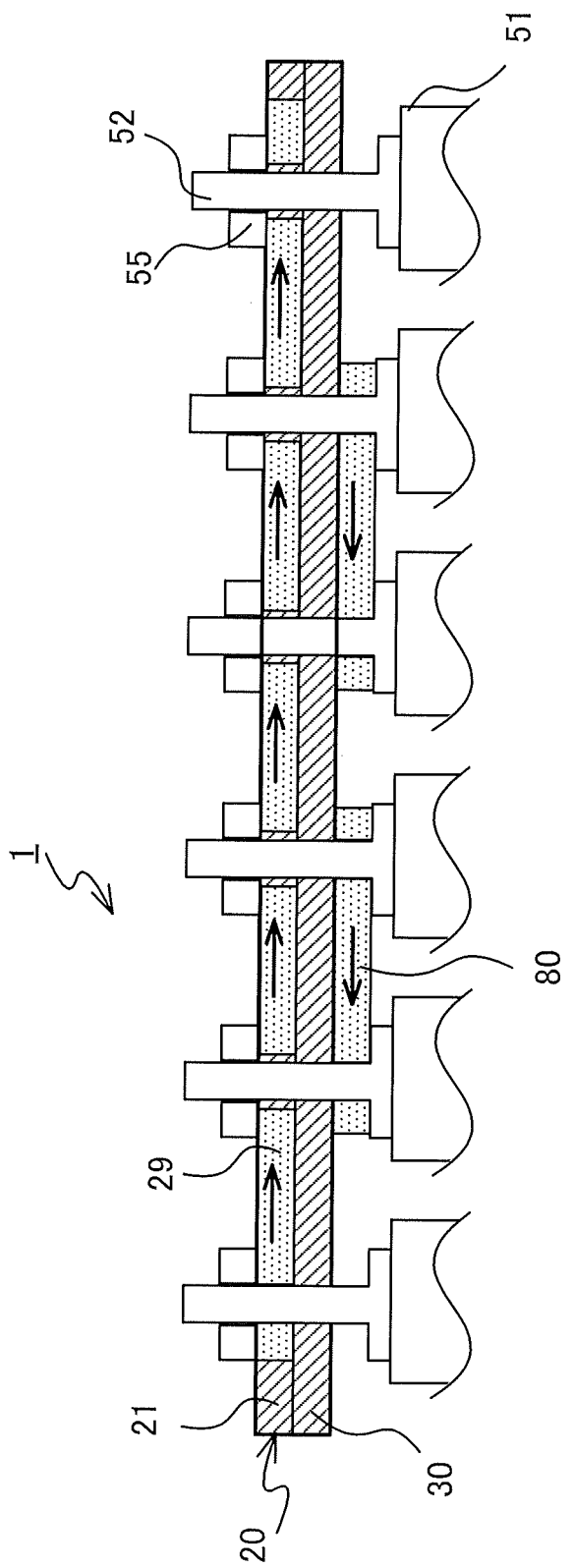
FIG. 19 is a partial cross-sectional view of the storage battery module according to Embodiment 3.

FIG. 19 is a partial cross-sectional view of the storage battery module according to Embodiment 3. FIG. 19 is a portion of the cross-sectional view of the storage battery module 1 taken along E-E line in FIGS. 17 and 18. In order of first plate-shaped members 80, the insulating member 30, and the second plate-shaped member 20, these members are stacked and then fixed to the terminals 52 of the battery cells 51 by the nuts 55. In FIG. 19, the areas indicated with diagonal lines are the second insulator 21 and the insulating member 30, and the areas indicated with dots are the first plate-shaped members 80 and the copper substrate 29. In FIG. 19, the solid-line arrows indicate current flow.

Figure 20:
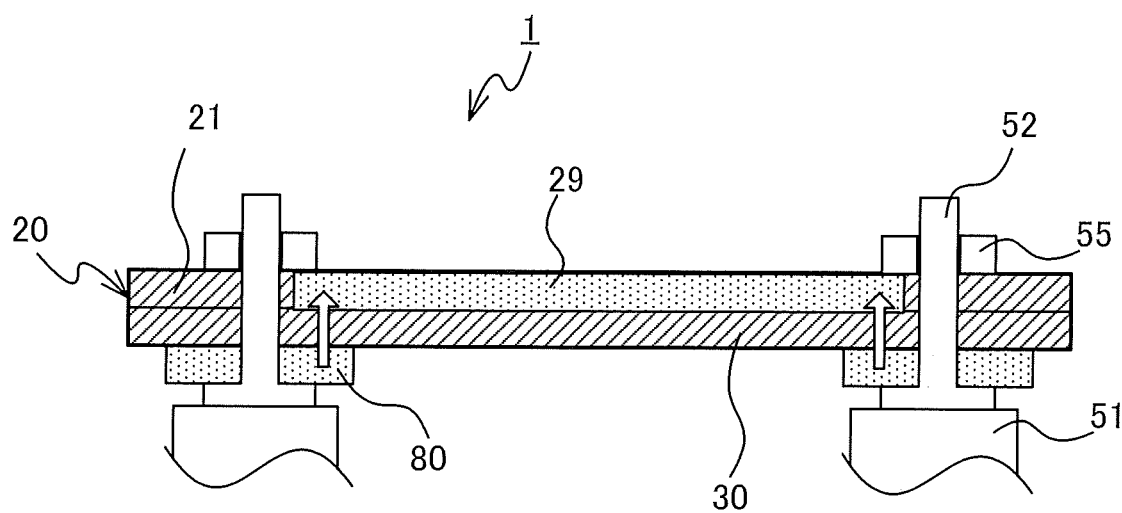
FIG. 20 is a partial cross-sectional view of the storage battery module according to Embodiment 3.

FIG. 20 is a partial cross-sectional view of the storage battery module according to Embodiment 3. FIG. 20 is a portion of the cross-sectional view of the storage battery module 1 taken along F-F line in FIGS. 17 and 18. FIG. 20 is oriented in a manner similar to that of FIG. 19. The first plate-shaped members 80 and the copper substrate 29 oppose each other across the insulating member 30. As indicated by the solid white arrows in FIG. 20, heat generated by the first plate-shaped members 80 is transferred to the copper substrate 29 via the insulating member 30 and then the heat is dispersed inside the copper substrate 29. Therefore, a variance in temperature among the battery cells 51 can be suppressed or prevented.

Figure 21:
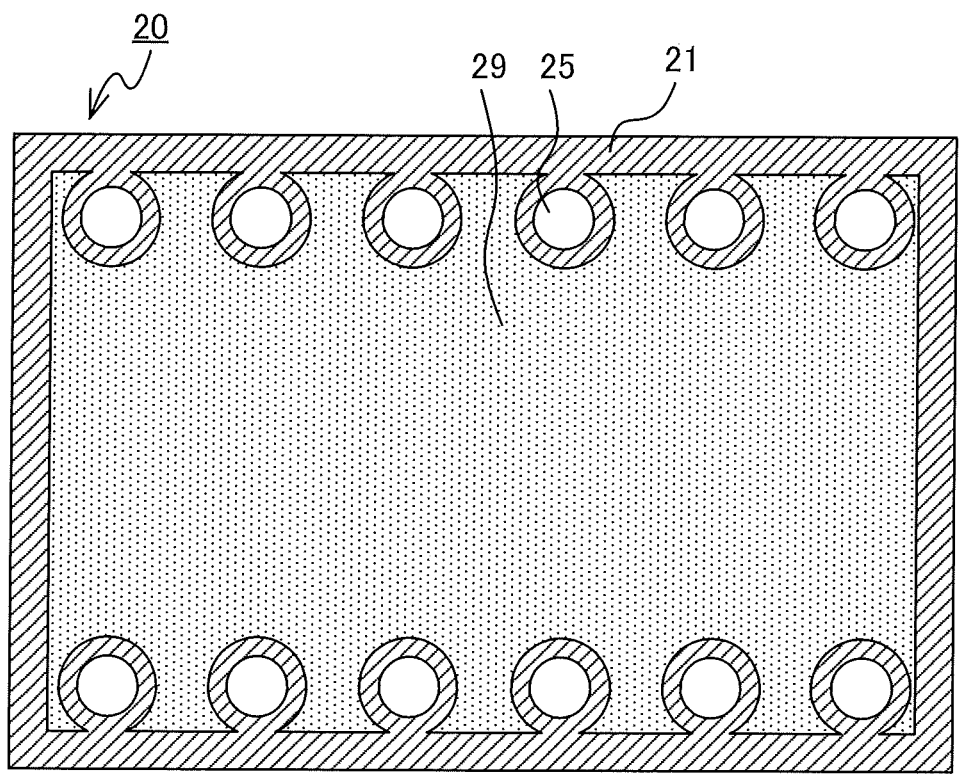
FIG. 21 is a plan view illustrating the second plate-shaped member according to Embodiment 3.

FIG. 21 is a plan view illustrating the second plate-shaped member according to Embodiment 3. In the second plate-shaped member 20, the copper substrate 29 and all of the terminals 52 of the battery cells 51 may be separated from one another by the second insulator 21.

In Embodiment 3, a control circuit that performs cell balance control may be mounted on the copper substrate 29 of the second plate-shaped member 20, or a substrate mounted with a control circuit may be connected to the first plate-shaped members 80 and the second plate-shaped member 20.

As described above, by providing the first plate-shaped members 80 and the second plate-shaped member 20 equipped with the copper substrate 29 that causes heat transferred from the first plate-shaped members 80 to disperse inside the copper substrate 29, the storage battery module 1 according to Embodiment 3 can suppress or prevent a variance in temperature among the battery cells 51. Since a variance in temperature among the batter cells 51 can be suppressed or prevented, the lifespan of the storage battery module 1 can be prolonged. Since the copper substrate 29 is used for the second plate-shaped member 20, the thickness is increased to a greater extent than in the case of Embodiments 1 and 2 where the print substrate is utilized, and thus the heat is dispersed to an even greater extent and a temperature variance among the battery cells 51 can be prevented or suppressed to an even greater extent.

Embodiments of the present disclosure are not limited to the above embodiments. A plurality of at least one of the first plate-shaped member 10, the second plate-shaped member 20, or the third plate-shaped member 70 may be provided in accordance with the current through the battery cells 51. In Embodiment 1, the positions of the first plate-shaped member 10 and the second plate-shaped member 20 may be exchanged, and in Embodiment 2, the order of the first plate-shaped member 10, the second plate-shaped member 20, and the third plate-shaped member 70 may be changed.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

REFERENCE SIGNS LIST

1 Storage battery module
10, 80 First plate-shaped member
11 First insulator
12 First connecting conductor
13, 14, 23, 24, 28, 72, 73, 74 Conductor
15, 16, 17, 25, 26, 27, 31, 32, 33, 40, 41, 42, 43, 44, 45, 46, 47, 75, 76, 77, 81, 82 Through-hole
20 Second plate-shaped member
21 Second insulator
22 Second connecting conductor
29 Copper substrate
30 Insulating member
50 Housing
51 Battery cell
52 Terminal
53 Positive terminal
54 Negative terminal
55 Nut
60 Control circuit
61, 71 Insulator
62 Voltage measurement pattern
70 Third plate-shaped member

The invention claimed is:

1. A storage battery module comprising:
   battery cells;
   a first plate-shaped member having first connecting conductors formed therein, the first connecting conductors (i) being conductors that electrically connect together terminals of the battery cells that are adjacent to one another, and (ii) being separated from one another by a first insulator; and
   a second plate-shaped member having a heat dispersion region formed by a member that has a thermal conductivity that is greater than a remaining region of the second plate-shaped member, the heat dispersion region opposing at least a portion of the first connecting conductors of the first plate-shaped member across an insulating member in a direction perpendicular to a main surface of the first plate-shaped member, to cause heat transferred from the first connecting conductors to be dispersed into the heat dispersion region, wherein
   the second plate-shaped member has second connecting conductors formed therein, the second connecting conductors (i) being conductors that electrically connect together terminals of the battery cells adjacent to one another, and (ii) being separated from one another by a second insulator, and
   the heat dispersion region is a conductor, the conductor being separated from the second connecting conductors by the second insulator.

2. The battery storage module according to claim 1, wherein
   the heat dispersion region is (i) a conductor and is separated from all of the terminals of the battery cells by an insulator or (ii) is a conductor that electrically connects a terminal of the storage battery module to a terminal of a battery cell among the battery cells, and is separated from terminals of the other battery cells by a second insulator.

3. A storage battery module comprising:
   battery cells;
   first plate-shaped members, each first plate-shaped member being a conductor that electrically connects together terminals of the battery cells that are adjacent to one another; and
   a second plate-shaped member having a heat dispersion region formed by a member that has a thermal conductivity that is greater than a remaining region of the second plate-shaped member, the heat dispersion region opposing the conductors of the first plate-shaped member across an insulating member in a direction perpendicular to a main surface of the first plate-shaped member, to cause heat transferred from the conductors to be dispersed into the heat dispersion region, wherein
   the second plate-shaped member is a single copper substrate, and
   the second plate-shaped member opposes the first plate-shaped members across the insulating member, and is a conductor that electrically connects a terminal of the storage battery module to a terminal of a battery cell among the battery cells, and is separated from the other battery cells by an insulator.

4. A storage battery module comprising:
   battery cells;
   a first plate-shaped member having first connecting conductors formed therein, the first connecting conductors (i) being conductors that electrically connect together terminals of the battery cells that are adjacent to one another, and (ii) being separated from one another by a first insulator; and
   a second plate-shaped member having a heat dispersion region formed by a member that has a thermal conductivity, the heat dispersion region opposing at least a portion of the first connecting conductors of the first plate-shaped member across an insulating member in a direction perpendicular to a main surface of the first plate-shaped member, to cause heat transferred from the first connecting conductors to be dispersed into the heat dispersion region, wherein
   the second plate-shaped member has second connecting conductors formed therein, the second connecting conductors (i) being conductors that electrically connect together terminals of the battery cells adjacent to one another, and (ii) being separated from one another by a second insulator, and
   the heat dispersion region is a conductor, the conductor being separated from the second connecting conductors by the second insulator.

* * * * *